United States Patent [19]

Buchner

[11] 4,290,267

[45] Sep. 22, 1981

[54] METHOD FOR RECOUPING COMBUSTION HEAT

[75] Inventor: Helmut Buchner, Wendlingen, Fed. Rep. of Germany

[73] Assignee: Daimler-Benz Aktiengesellschaft, Stuttgart, Fed. Rep. of Germany

[21] Appl. No.: 876,103

[22] Filed: Feb. 8, 1978

[30] Foreign Application Priority Data

Feb. 8, 1977 [DE] Fed. Rep. of Germany ....... 2705145

[51] Int. Cl.³ ............................................. F01K 17/00
[52] U.S. Cl. ........................................ 60/648; 60/670; 60/676; 62/48; 123/3; 123/DIG. 12
[58] Field of Search ................. 60/648, 649, 673, 676, 60/39.12, 39.46 G, 670, 645; 123/DIG. 12, 1 A, 3; 62/48

[56] References Cited

U.S. PATENT DOCUMENTS

| | | | |
|---|---|---|---|
| 3,732,690 | 5/1973 | Meijer | 123/1 A X |
| 3,943,719 | 3/1976 | Terry et al. | 60/649 X |
| 3,950,949 | 4/1976 | Martin et al. | 60/676 X |
| 4,011,840 | 3/1977 | Forster | 123/DIG. 12 |
| 4,018,190 | 4/1977 | Henault | 123/3 |
| 4,085,590 | 4/1978 | Powell et al. | 60/673 |
| 4,090,361 | 5/1978 | Terry et al. | 60/673 X |

Primary Examiner—Allen M. Ostrager
Assistant Examiner—Stephen F. Husar
Attorney, Agent, or Firm—Craig and Antonelli

[57] ABSTRACT

A method and apparatus for at least partially recovering the exhaust heat of combustion operations in which hydrogen is used at least partially during the combustion, which is stored in the form of metal hydride in a metal storage device and is released therefrom by a supply of heat energy. Exhaust heat of the combustion is supplied to the metal hydride for the release of the hydrogen while the metal storage device freed at least to a large extent of the hydrogen is utilized as storage device of latently bound heat energy whose heat energy is utilized, such latently bound heat energy being released during the filling of the metal storage device with hydrogen into metal hydride.

25 Claims, 7 Drawing Figures

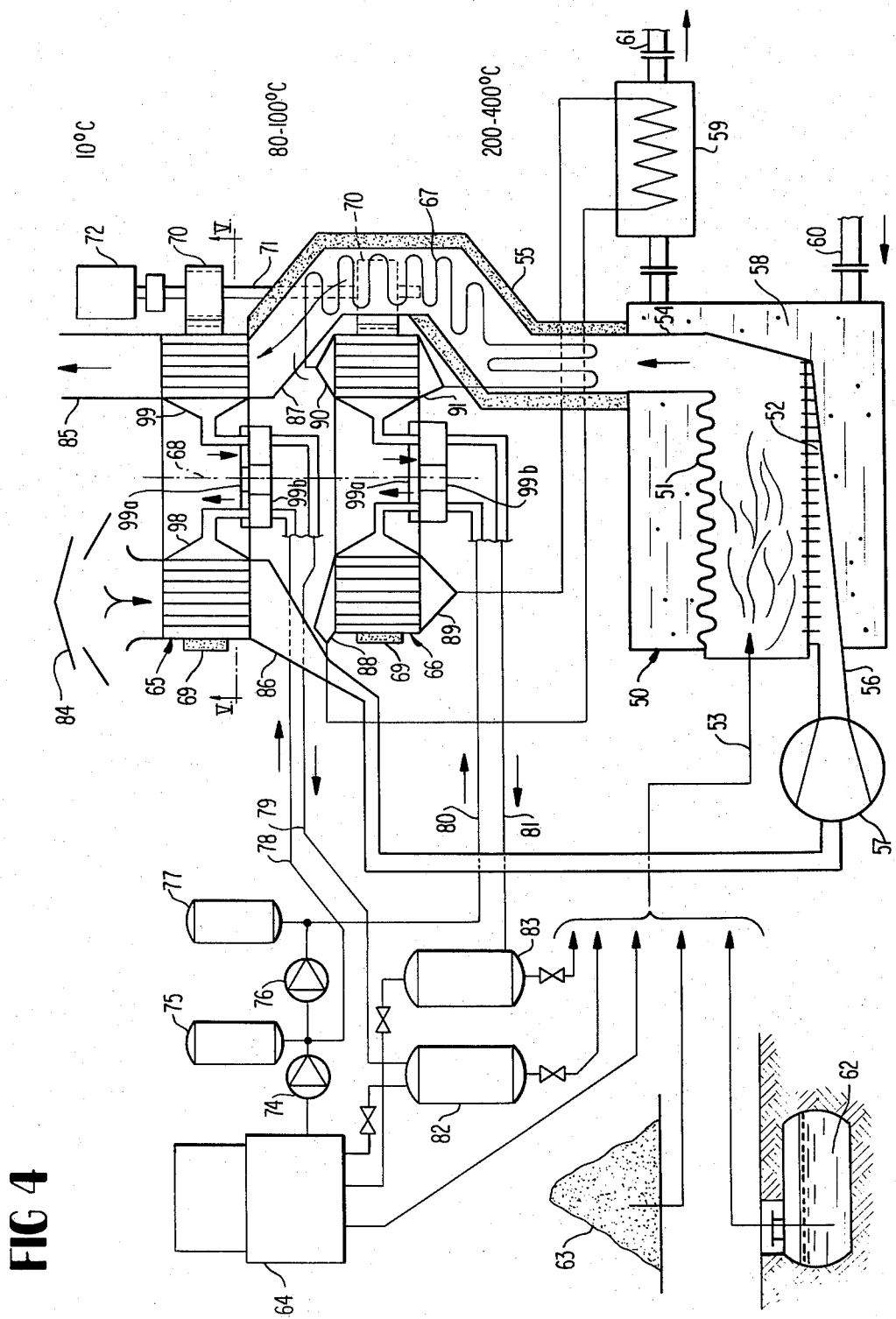

METHOD FOR RECOUPING COMBUSTION HEAT

This present invention relates to a method for at least partially recovering the exhaust heat of combustion processes.

The efficiency of combustion processes is very poor as known. A considerable proportion of the energy contained in the propellant or fuel to be combusted is contained in the exhaust gas of the combustion and is non-utilized. Installations and methods for the exhaust heat recovery are known in the art; however, by reason of the requirement of a driving temperature drop between the heat-transmitting and heat-absorbing medium, this exhaust heat has been utilized heretofore only partially. Especially in internal combustion engines of vehicles, heat recovery is not acceptable in view of the vehicle weight which is to be kept as low as possible and a view of the expenditure eventually required therefor.

It is the aim of the present invention to indicate possibilities of a better exhaust heat recovery which are also acceptable from the point of view of expenditures.

The underlying problems are solved according to the present invention in that hydrogen is used, at least in part during the combustion, which is stored in the form of a metal hydride in a metal storage device and which is released therefrom by the supply of heat energy, in that for the release of the hydrogen, exhaust heat of the combustion is supplied to the metal hydride and in that the metal storage device freed at least to a large extend of hydrogen is used as a storage device of latently bound heat energy whose heat energy, which is released during the filling of the metal storage device with hydrogen into metal hydride, can be effectively used. The use of hydrides of metals or metal alloys as hydrogen storage means for a motor vehicle or as a stationary storage means is always connected with a heat supply to the storage means for the release of the hydrogen out of the hydride for driving or heating purposes, whereby the hydrides or metal storage means have to be so selected that their release energies for hydrogen lie always below the energies of the combustion exhaust heat. It can always be achieved therewith that parts of the exhaust heat energy or the entire heat energy are stored as latent energy in the crystal lattice. Conversely during the tanking of the empty alloy with the gaseous hydrogen under renewed formation of the hydride, the hydrogen binding energy then becomes free again and more particularly corresponding to the respective pressure/temperature behavior within the range between about 80° and about 400° C. This heat quantity can be removed during the tanking out of the storage means as heated air, as steam or as heated water and can be utilized for heating purposes. By reason of a suitable selection of metal hydrides with a corresponding condition of the pressure/temperature behavior, dissociation temperatures can be obtained with suitable control of the dissociation pressures during the emptying and/or the filling of the storage device, by means of which the exhaust air can be cooled off to below the ambient temperature and considerably more energy can be removed therefrom than heretofore. With the use in combustion engines, in which approximately one-third of the energy chemically bound in the fuel is found again mechanically non-utilized in the exhaust gases and in which approximately a further third of the applied energy is given off to the ambient air by way of the engine cooling system, a particularly high proportion in energy can be recovered usefully by means of the regeneratively operated exhaust heat recovery according to the present invention utilizing a metal hydride storage means. The driving of vehicle combustion engines with hydrogen offers especially in high-density traffic spaces (in bumper to bumper traffic) the advantage of exhaust gases free of harmful components. With the use of the exhaust heat recovery according to the present invention, such types of vehicles are therebeyond also completely emission-free as regards the heat emission, which may be particularly valuable for the use in longer underground distances.

Accordingly, it is an object of the present invention to provide a method and apparatus for the recovery combustion exhaust heat which avoids by simple means the aforementioned shortcomings and drawbacks encountered in the prior art.

Another object of the present invention resides in a method and apparatus for the recovery of combustion exhaust heat which can be readily accepted as regards the requirements for a low vehicle weight and for relatively small costs.

A further object of the present invention resides in a method and apparatus for recouping combustion exhaust heat, especially in motor vehicles, which greatly improves the thermal efficiency of the system while at the same time improving the exhaust gas quality of the engines.

Still another object of the present invention resides in a method and apparatus for recovering combustion exhaust heat which is substantially completely emission free as regards heat emission, thereby availing itself in particular also for use in underground systems.

These and other objects, features and advantages of the present invention will become more apparent from the following description when taken in connection with the accompanying drawing which shows, for purposes of illustration only, several embodiments in accordance with the present invention, and wherein:

FIG. 4 is a schematic view for a two-stage exhaust heat recovery according to the present invention in a heat power plant;

Figure 2:
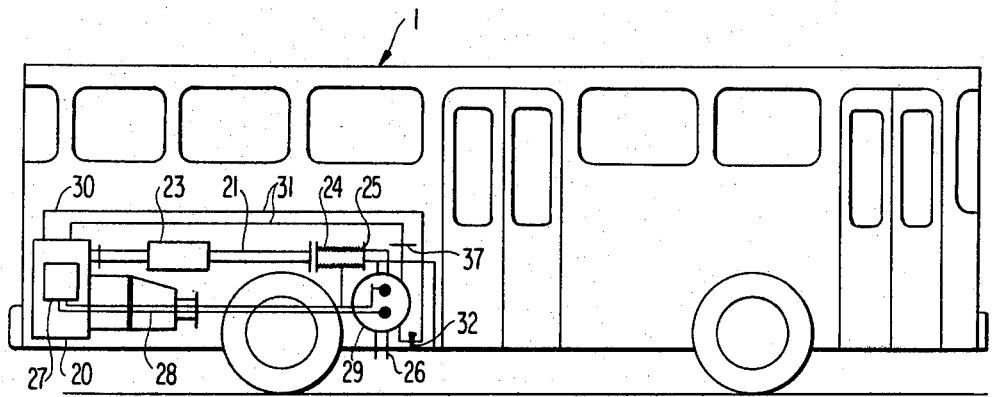
FIG. 2 is a schematic side elevational view of a bus equipped for the exhaust heat recovery of the combustion engine in accordance with the present invention.

Referring now to the drawing wherein like reference numerals are used throughout the various views to designate like parts, at first the bus generally designated by reference numeral 1 in FIG. 2 will be explained briefly for describing the embodiment of the exhaust heat recovery of buses according to this invention. The combustion engine 20 illustrated in FIG. 2 as a rectangular block in the rear of the bus is operated with hydrogen as fuel, which is stored in the metal hydride storage device 29, is supplied by way of the line 28 and in the fuel mixture and metering aggregate 27 of conventional construction is fed to the working spaces of the engine. A water-cooled engine is assumed to be used with the combustion engine 20 whose cooling water connections 30 at the engine are extended by way of the lines 31 not, for example, to an air/water heat-exchanger but instead to the metal hydride storage device 29 and are connected thereat by way of conventional rapid connections 32 with the interior of the storage device. The exhaust gas line 21 of the engine which includes a muffler 23 is also connected to the metal hydride storage device 29 by way of a rapid pipe coupling 25 under interconnection of an easily movable pipe section 24 and terminates in the atmosphere by way of the connection 26 arranged at the bottom of the storage device 29. By reason of these connections of the engine on the side of the exhaust gas and on the side of the cooling water with the metal hydride storage device, and entire exhaust heat of the combustion engine 20 is utilized for the release of hydrogen out of the storage device 29. With an increasing emptying of the storage means 29 of hydrogen, increasingly more exhaust heat of the engine is chemically and reversibly bound in the storage means 29. A heat insulation against heat loss is not required because the heat is contained in the storage substance in the form of binding energy. Exclusively along the line path from the engine 20 to the storage device 29, a heat insulation is provided because heat losses are possible along this path. Especially with the use of high temperature hydrides which depending on the hydrogen pressure, operate at temperature of about 200° to about 500° C., care must be taken that the exhaust gases are still as hot as possible when they encounter the storage material or its metallic casing. For that reason, a thermal insulation of the storage device 29 might be worthwhile which, however, could also be fixedly arranged in the vehicle within the space accommodating the storage device.

Figure 3:
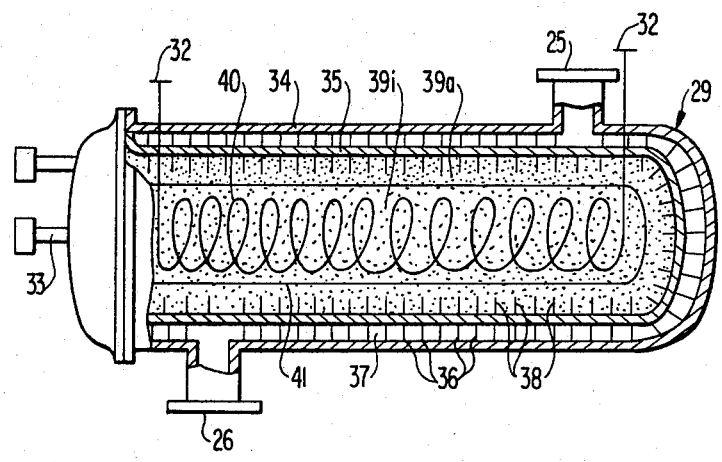
FIG. 3 is a somewhat schematic view of a metal hydride storage device, partly in cross section, for use in the bus according to FIG. 2.

The metal hydride storage device generally designated by reference numeral 29 is illustrated in detail in the form of a possible embodiment in FIG. 3; a certain peculiarity of this storage device resides in that it can be fed both with respect to a liquid as also with respect to a gaseous heat-exchange medium. A granulate 39 of a suitable metal hydride respectively of a metal or metal alloy adapted to be hydrogenated is contained in an inner pressure vessel 35 of a material diffusion-impermeable against hydrogen. An outer pressure vessel 34 is placed about the inner pressure vessel 35 while maintaining an intermediate space 37. Internal heat-exchanging ribs 38 which are mounted on the inside of the container 35 project into the interior of the granulate 39, which have the task to establish as good a heat-conducting connection as possible between the inner container wall and the graulate. Similarly, heat-exchanging ribs 36 are provided on the outside of the inner container, which have the task to establish as good a heat transfer as possible from a gaseous medium flowing in the intermediate space 37 to the container wall 35. The exhaust gas is conducted during engine operation through the intermediate space 37 formed between the two containers or vessels 34 and 35. A cooling coil 40 is embedded on the inside of the granulate which is connected during engine operation by way of the connections 32 with the cooling water circulation system of the engine. The interior of the granulate is reached by way of the cooling coil 40 whereas, in contrast thereto, the outer zones of the granulate are adapted to be reached by way of the casing 35 and the ribs mounted thereon. The gas connection which is provided at the cover flangedly connected at the end face, terminates eventually directly in the granulate by way of a retention sieve. Hydrogen is removed by way of this gas connection during engine operation.

For the better heat conduction inside of the metal granulate, the latter can be pressed or sintered into permanent shape. It is appropriate if copper or aluminum chips are pressed together with the metal granulate. The latter do not hydrogenate and retain their good thermal properties. They assure a good heat flow in the pressed blank of metal hydride granules which even in the hydrogenated condition are themselves poorly heat-conducting. The porous proportion in the granulate should amount at least to about 5 to about 10% in order to provide still sufficient gas-exchange channels inside of the pressed blank or of the sintered body.

The filling of the inner metal hydride storage device encapsulated by the wall 41 and traversed by the pipe coil 40 consists of a low temperature metal hydride, for example, of titanium-iron-hydride, with which at temperatures of about −20° to about 80° C. (for example, cooling water) and at an excess pressure of about 1–10 bars, the storage device is operable to be completely emptied of hydrogen. The outer storage device between the walls 35 and 41 consists of a high temperature metal hydride, for example, of magnesium-nickel-hydride; at excess pressures of about 1 bar, temperatures above approximately 300° C. are required in that case for the far-reaching emptying of the storage device. Such temperatures can be supplied with engine exhaust gases if the exhaust gas lines are heat-insulated.

A metal hydride storage device is assumed in the further embodiments which may be assembled or constructed according to the embodiment of FIG. 3 but which includes only one type of storage material for the recovery of exhaust gas heat.

The embodiment of the exhaust heat recovery by means of metal hydride storage devices illustrated in FIG. 1 now takes place as follows: All of the buses of a regional system which are constructed for the exhaust heat recovery have mutually interchangeable identical metal hydride storage devices which can be exchanged rapidly. An exchange station for metal hydride storage devices is formed within the corresponding region in one power plant or in a few power plants, at which the storage devices 2 driven empty are disassembled from the arriving vehicles and are stored and in which storage devices 3 filled with hydrogen which are kept in stock, are again installed into the vehicle. This station or stations are regularly visited by the buses of the region, for example, daily for the storage device exchange.

It should be mentioned in that connection for the sake of completeness that in addition to the described exchange technique, also a direct tanking of the storage devices then left in the vehicle is possible. The vehicles would have to stop in such a case individually and sequentially at a filling and heat-exchange station. The storage device is connected thereat pressuretight to a hydrogen feed line; furthermore, a heat-exchange medium of a power plant, for example, water or steam, is connected to the heat-exchange surfaces of the respective storage device on the inlet and outlet side, which cools the storage device and thereby renders or keeps the same capable of absorbing hydrogen and thereby heats itself. After the filling of the storage device with hydrogen and after the removal of the latent stored heat, all connections are removed and are connected to the storage device of the next vehicle.

Figure 1:
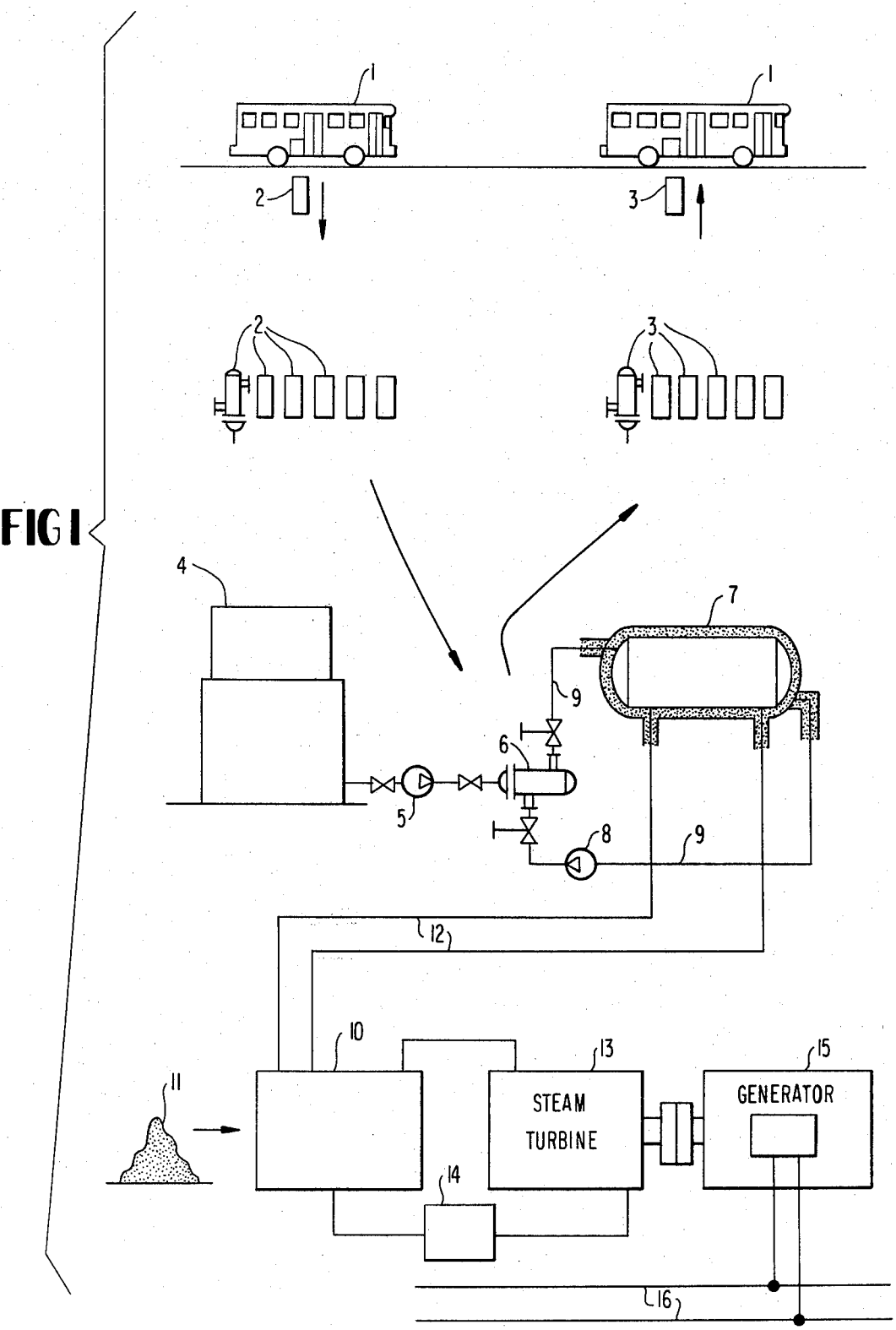
FIG. 1 is a schematic view of an exchange and filling station for metal hydride storage devices of buses in accordance with the present invention, with utilization of the hydrogen binding energy in a power plant.

The power plant illustrated in FIG. 1 consists of a boiler 10 fed with coal (coal pile 11), of a steam turbine set 13 and of a generator 15 which feeds an electrical network 16. The steam leaving the generator set 13 is condensed in the conductor 14 and the condensate is pumped back into the boiler 10. Heat-insulated lines 12 lead from the boiler 10 to the charging station where boiler water preheated in a heat-insulated container 7 can be held in storage or reserve. Boiler water can be pumped from this reservoir or storage means through a metal hydride storage device 6 to be charged and included in the circulation system by way of circulation lines 9 and a pump 8.

Additionally, a gas storage device or reservoir 4 is provided in the charging station, in which hydrogen or a gas-containing hydrogen is stored. The hydrogen can be supplied to the metal hydride storage device 6 at the required pressure magnitude by way of a pump 5. During the filling of the storage device 6 with hydrogen, the binding energy for the hydrogen is released, and the metal granulate heats up very strongly. With the use of magnesium-nickel alloys as substance for the metal hydride storage device, a diffusion temperature of 250° C. occurs, for example, with a hydrogen diffusion pressure of 1 bar, whereas at 10 bars a diffusion temperature of 500° C. occurs. A very high temperature drop compared to the boiler water to be heated can be produced thereby and a very high heating, respectively, evaporating output can be supplied to the water.

The use of high temperature hydrides such as, for example, $MgH_2$ or $Mg_2NiH_4$ in urban buses provides, for example, the following picture: Since the hydrogen binding energies of the mentioned hydrides lie within the order of magnitude of the exhaust gas heat, one requires for the release of 18 kilograms of hydrogen—this corresponds to approximately 60 liters of diesel fuel—180 megacalories which corresponds to the heating value of about 20 liters of diesel fuel. This value alone is contained in the exhaust gas of the hydrogen engine 20 of the bus 1. Once again the same quantity in heat is contained in the cooling water.

The following energy estimate now only assumes the utilization of the exhaust heat which is contained in the exhaust gas. During the tanking operation, the aforementioned 180 megacalories are again released per vehicle and more particularly within the temperature range between 200° and 400° C. depending on the hydrogen tanking pressure. If one assumes a number of about 300 buses which corresponds to a city with about 600,000 inhabitants, and if one assumes additionally a daily driving distance of 200 km. per bus, which corresponds to a daily fuel consumption of about 60 liters diesel oil, then the metal hydride storage device to be tanked of such a motor pool supply daily an energy quantity of 54 gigacalories which can be utilized directly in the illustrated manner. In the case of the 300 city buses, this corresponds to a yearly recoverable energy quantity with a heating value of more than 2,000 $m^3$ diesel fuel.

Apart from the possible energy savings, the described system of the exhaust heat recovery acording to the present invention additionally entails the advantage of a heat storing whose energy quantity can be intentionally utilized for energy coverage during periods of peak loads of the power plant. The operation of combustion engines with hydrogen as fuel offers the advantage of exhaust gases free of harmful components. If, therebeyond, —as described—the exhaust heat of the engines is stored and utilized, then one succeeds to operate the vehicles completely emission-free, i.e., also heat-emission-free which is of importance in particular during operation in longer underground distances.

Figure 5:
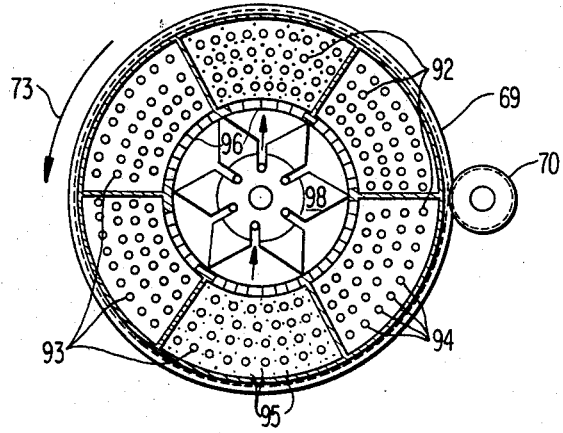
FIG. 5 is a schematic cross-sectional view, perpendicular to the axis of a rotatable regenerative heat-exchanger with a metal hydride storage device in accordance with the present invention.

An embodiment of the heat recovery is illustrated in FIGS. 4 and 5 by reference to a heat power station. The prior consists of a boiler generally designated by reference numeral 50 with a flame tube or flue 51 and a grate 52. The symbolically illustrated fuel supply 53 may consist of liquid fuels (oil tank 62), of solid fuels (coal pile 63) or as gaseous fuels. The combustion air is supplied to the boiler by way of the combustion air blower 57 and by way of the line 56. The water jacket 58 formed about the flame tube 51 is heated up by the combustion heat. Cooled-off water is conducted back to the water jacket 58 out of a heating system through the water return line 60 and heated-up water is conducted back into the heating system by way of the water inlet line 61.

The combustion exhaust air leaves the boiler through the flue gas exhaust or outlet 54 which is provided with a heat insulation 55; the exhaust gases contain a very large energy quantity in thermal energy which is to be recovered again. For the purpose, a system of pipe coils 67 is provided in the heat-insulated section of the flue gas outlet, in which circulates a heat carrier medium, for example, an oil with a high boiling temperature. As a result thereof, heat energy is removed from the flue gas in a first stage, whereby it is cooled off to temperatures within a range of about 80° to 100° C. Subsequently, the flue gas is conducted through a second cooling stage and is cooled off to ambient temperature or still lower before it reaches the atmosphere by way of the chimney or stack 85.

For purposes of utilization of the heat removed from the flue gas, two regeneratively operating metal hydride storage devices generally designated by reference numerals 66 and 65 which are designed for different temperature levels, are provided, of which one is illustrated in cross section in FIG. 5. With these rotating metal hydride regenerative heat-exchangers, several individual metal hydride storage devices that are encapsulated hydrogen-diffusion-impermeable against one another, are provided which are arranged in a circular form as closely adjoining one another as possible. The wheel-shaped regenerative heat-exchangers formed in such a manner are rotatably supported about the axis 68 (FIG. 4) and are adapted to be driven by the motor 72 by way of a toothed rim 69 arranged along their outer circumference and by way of the driven pinion 70 as well as the drive shaft 71. A large number of axially parallelly extending heat-exchanger pipes 94 (FIG. 5) is provided on the inside of the individual metal hydride storage devices, through which flow the heat-absorbing, respectively, heat-emitting media. A granulate of metal hydride 95 is filled-in between the pipes 94. Apertured plates 96 are provided along the radially inner circumference of the metal hydride storage devices, on which side hydrogen can be pressed into the granulate pores or removed therefrom by way of a gas distribution or gas manifold hood 98. Those metal hydride storage devices which at a given time are in contact with the heat-transmitting medium, can be connected with a gas outlet line 81, respectively, 79 by way of a gas distributor head formed of a rotating part 99a rotating in unison therewith and of a stationary part 99b, which gas distributor head is arranged concentrically to the axis of rotation 68, whereas in contrast thereto, the dimetrically oppositely disposed metal hydride storage devices are connected with a gas feed line 78, respectively, 80.

Figure 7:
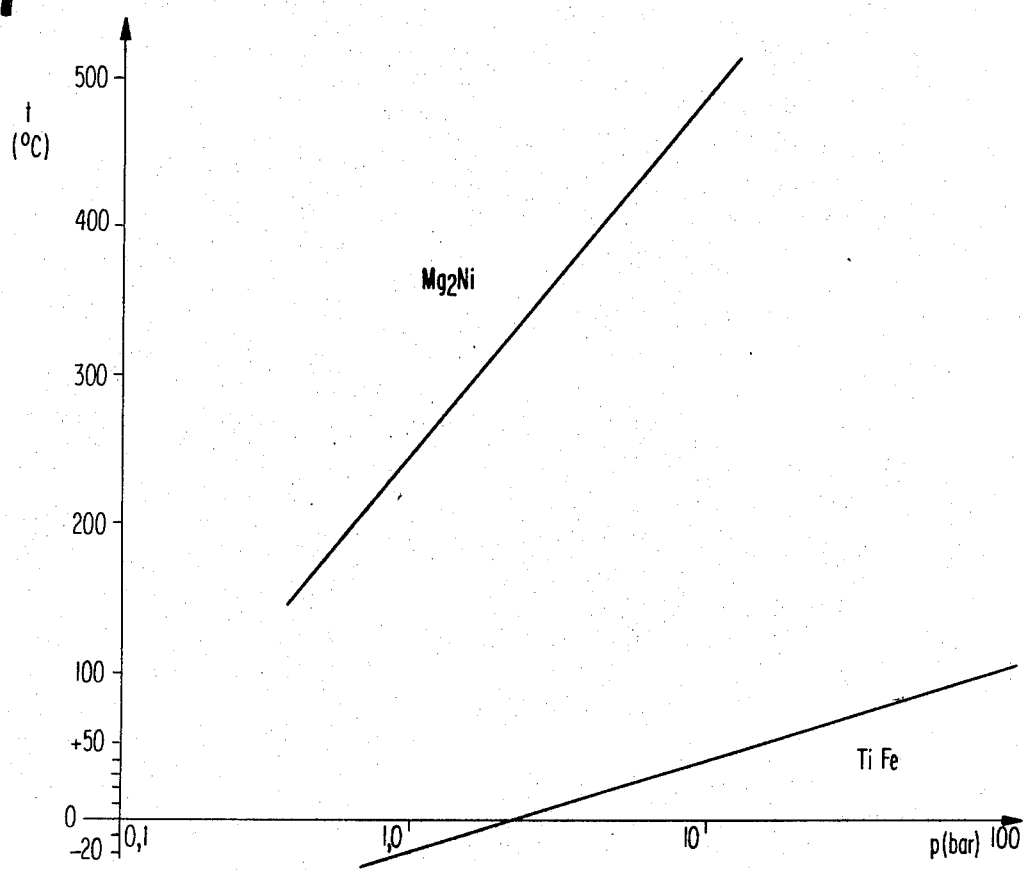
FIG. 7 is a diagram with the pressure/temperature curves of different metal alloys which are suitable for metal hydride storage devices of the present invention.

The lower metal hydride regenerative heat-exchanger 66 illustrated in FIG. 4 is constructed as high temperature heat-exchanger and, accordingly, is filled with a high temperature metal hydride, for example, with magnesium-nickel-metal hydride. The upper one (65) of the two storage devices or heat-exchangers is filled with a low temperature metal hydride, for example, with titanium-iron-metal hydride. The pressure-temperature lines of these two storage alloys are illustrated in FIG. 7. The metal hydride storage device arranged on the heat-absorbing side of the high-temperature heat-exchanger 66 is connected with the gas removal line 81 which terminates in the gas storage tank or reservoir 83 which is kept under a predetermined pressure. Similarly, the metal hydride storage device of the upper regenerative heat-exchanger which, at a given time, is on the heat-absorbing side, is connected on the gas side by way of the gas removal or outlet line 79 also with a gas storage tank or reservoir and more particularly with the storage tank 82 in which a different predetermined pressure is controllingly established. On the heat-transmitting side (heat-emitting side) of the upper regenerative heat-exchanger 65, the metal hydride storage devices are traversed by combustion air sucked-in by way of the hood 84, which is heated up therein and is conducted to the blower 57 by way of the fresh air manifold 86 and a connecting line. The heat-transmitting metal hydride storage devices which are capable of absorbing hydrogen are connected on the gas side by way of the gas feed line 78 with a first pressure container 75 which can be filled out of the hydrogen reservoir or storage container 64 by way of the pump 74 and can be kept under a continuously constant predetermined pressure. The heat-transmitting metal hydride storage devices of the other regenerative heat-exchanger 66 designed for a high temperature level are connected on the gas side by way of the gas feed line 80 also with a pressure container and more particularly with the second pressure container 77 which is kept under an increased pressure by way of the pump 76. For purposes of absorbing the heat given off by these metal hydride storage devices, they are successively connected on the heat-absorbing side to locally stationary manifolds or distributor heads for the heat-exchange medium of the flue gas heat-exchanger 67 which may be an oil having a high boiling point or saturated steam. The metal hydride storage devices are cyclically sequentially connected on the heat-transmitting side to corresponding stationary manifolds or distributor heads for a heat-exchange medium of a second circulatory system. A water superheater 59 arranged in the inlet line 61 belongs to this circulatory system. The heat-transfer medium, for example, high-pressure saturated steam which is heated-up in the heat-transmitting metal hydride storage device, circulates in this circulatory system and continuously gives off its heat in the superheater 59 to the inlet water of the boiler. By reason of the "cooling" of the heat-transmitting metal hydride storage device effected thereby, the latter becomes capable of absorbing hydrogen which is supplied thereto by way of the lines 80—or in the case of the upper heat-exchanger 65—by way of the lines 78.

The operation of the described installation is now as follows: As a result of the internal pressure control in the container 83, a predetermined temperature, for example, 170° C. can be controllingly established in the heat-absorbing metal hydride storage device of the high-temperature regenerative heat-exchanger 66. It becomes possible thereby to cool down the flue gas by way of the coils 67 to about 200° to 240° C. and to remove therefrom a corresponding heat content to the same extent. The hydrogen gas released thereby from the metal hydride storage devices is fed to and stored in the gas container 83 and in case of a pressure increase is either discharged into the gas tank 64 or is combusted in the boiler 50 together with the other fuels. The heat latently stored in the metal hydride is again released by the supply of hydrogen, whereby by suitable selection of the hydrogen diffusion pressure which is predetermined by the pressure in the containers or tanks 77 or 75, the temperature level in the corresponding metal hydride storage device can be determined and above all, can be set considerably higher than on the heat-absorbing side. As a result thereof, very high driving temperature drops can be achieved and therewith high outputs in heat energy can be transferred.

After a cooling off of the flue gas to about 180° to 220° C. in a first stage and the useful recovery of the heat removed up to that point, the flue gas in a second stage flows itself directly through the pipes of corresponding metal hydride storage devices designed for low temperature level, whereby it can be cooled off without difficulty to room temperature or also to lower temperatures, for example, to within proximity of the freezing point. With a control of the hydrogen diffusion pressure on the heat-absorbing side, respectively, on the hydrogen output side to 1 bar, temperatures of −20° C. occur in the metal hydride granulate without heat supply. By reason of such low temperatures adapted to be controllingly adjusted in the heat-absorbing metal hydride storage device, a very strong temperature drop can be established and the flue gas can be cooled down very low so that far-reachingly all utilizable heat-energy can be removed therefrom. On the heat-transmitting or hydrogen-absorbing side of the low temperature regenerative heat-exchanger 65, a temperature within the range of about 50° to 60° C. can be controllably established by suitable control of the hydrogen diffusion pressure, as a result of which a good combustion air preheating is attainable.

Figure 6:
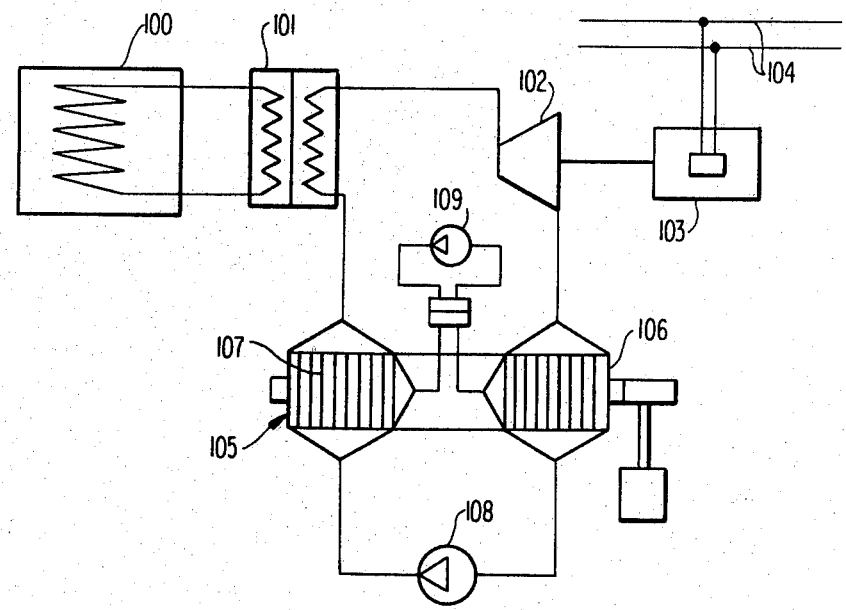
FIG. 6 is a schematic view illustrating the application of the exhaust heat recovery according to the present invention with the condensation and reheating of the condensate in a steam power plant.

In the embodiment of the exhaust heat recovery according to the present invention illustrated in FIG. 6, a different type of exhaust heat is involved, and more particularly the condensation heat of a steam power plant. It is assumed that it involves a nuclear power plant with a nuclear reactor 100 as heat source for steam generation. The heat resulting in the reactor is transferred in the heat-exchanger 101 to the working medium of the steam circulation system by way of a circulation medium and the working medium is thereby transferred into high pressure steam. The energy contained in the steam is converted into mechanical energy in turbine set 102, which, in turn, is converted in the regenerator 103 into electrical energy which is fed into the network 104. The expanded steam leaving the turbine must be condensed for the volumetric reduction of the working medium. The condensate can thereby be pumped back in a work-saving manner by the boiler feed pump 108 to the high pressure side of the circulatory system. The condensation heat has to be removed from the working medium for purposes of condensation. For that purpose, a set generally designated by reference numeral 105 of regenerative heat-exchangers 106 and 107 can be provided. The heat-absorbing and hydrogen-releasing metal hydride storage device which is traversed by the expanded steam is connected on the gas side to the suction side of a gas feed pump 109 and is kept thereby at a relatively low pressure whereby the heat-absorbing walls of the corresponding metal hydride storage device are very cold and are able to absorb a high heat output. As a result thereof, also a less strongly expanded steam can be recondensed whereby the very voluminous saturated steam stages of the turbine set 102 can be dispensed with. By reason of the useful recovery of the condensation heat, the expansion process can be interrupted quite somewhat earlier without energy loss. The working medium condensed in the heat-absorbing metal hydride storage device is brought to the working pressure of the boiler by the boiler feed pump 108 and is pumped heat-absorbingly through the heat-transmitting and hydrogen-absorbing metal hydride storage device 107. The gas feed pump 109 which, with its high pressure side is connected on the gas side to the metal hydride storage device capable of absorbing hydrogen, controls therein a relatively high hydrogen diffusion pressure and thus a correspondingly high granulate temperature lying far above the condensate temperature so that the condensate can be evaporated at least into saturated steam.

The advantage of such an arrangement is the fact that a power plant can be operated in this manner heat-emission free. Especially with the large power plant blocks that are possible with nuclear reactors, the thermal load of the power plant environment assumes in part worrisome extents, as a result of which the climate of the nearby environment, e.g. within a radius of 10 kilometers to 20 kilometers, can be changed and even large rivers can be heated in a biologically non-permissive manner. These environmental damages are avoidable by the exhaust heat recovery according to the present invention.

By reason of the high pressures in the heat-absorbing circulatory medium, it may be appropriate to arrange the individual regenerative heat-exchangers stationary in lieu of a rotating set of regenerative heat-exchangers and to cyclically change their incorporation on the circulation side and on the hydrogen side by way of alternating valves or the like. As to the rest, it is, of course, also feasible to effect the heat-exchange under interconnection of a heat-exchange medium, for example, water on one side and saturated steam on the other side.

While I have shown and described several embodiments in accordance wih the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for the regenerative heat-exchange with a exchange of heat-absorbing body means in a heat-emitting flow and a heat-emitting body means in a heat-absorbing flow, characterized in that the body means are constructed as metal hydride storage means, the heat-emitting flow is exhaust gases of combustion of an internal combustion engine in a motor vehicle, the heat-absorbing flow is a stationary heating means, and in that the storage means are interchangeable so as to be removed, replaced and stored.

2. An installation for at least partially recovering the exhaust heat of a combustion operation, comprising:
   metal hydride storage means containing a low temperature responsive hydride and a high temperature responsive hydride;
   means for supplying the exhaust heat of combustion to said storage means so as to cause a release of hydrogen therefrom;
   means for supplying a heated coolant, which has been utilized to remove the heat of combustion from areas proximate said combustion, to said storage means so as to cause a release of hydrogen therefrom;
   means for utilizing said hydrogen within said combustion operation.

3. An installation according to claim 2, and further comprising:
   means for recharging said storage means with hydrogen upon the depletion of some hydrogen therefrom;
   means for utilizing the heat released from said storage means during said recharging.

4. An installation according to claim 2, wherein said exhaust heat of combustion is directed to said high temperature responsive metal hydride and said heated coolant is directed to said low temperature responsive metal hydride.

5. An installation according to claim 4, characterized in that said installation is utilized in conjunction with an internal combustion engine of a vehicle, wherein said hydrogen is used as a fuel for combustion, and said storage means is removable from said vehicle for recharging.

6. A method for at least partially recovering the exhaust heat of a combustion process, comprising the steps of:
   utilizing a storage means having a low temperature responsive metal hydride and a high temperature responsive metal hydride contained therein;
   supplying the exhaust heat of combustion to said high temperature responsive metal hydride so as to cause a release of hydrogen therefrom;
   supplying a heated coolant, which has been utilized to remove the heat of combustion from areas proximate said combustion, to said low temperature responsive metal hydride so as to cause a release of hydrogen therefrom;
   utilizing said hydrogen within the combustion process.

7. An installation according to claim 6, and further comprising the steps of:
   recharging said storage means with hydrogen upon the depletion of some hydrogen therefrom; and
   utilizing heat release from said storage means during said recharging.

8. A method for at least partially recovering exhaust heat of combustion, comprising the steps of utilizing hydrogen for combustion which is present in metal hydrides in a metal storage means and is released therefrom by a supply of heat energy, feeding exhaust heat of said combustion to the metal hydride for the release of the hydrogen, replacing the metal storage means freed at least to a large extent of hydrogen with another storage means filled with hydrogen, collecting the metal storage means freed at least in a large extent of hydrogen at an exchange station, and utilizing the metal storage means, freed at least to a large extent of hydrogen, as storage means of latently bound heat energy whose heat energy may be released and utilized during the filling of the metal storage means with hydrogen to form said metal hydride.

9. A method according to claim 8, further comprising the step of selecting such metals or metal alloys which can be used to form metal hydrides, in which the release energy for hydrogen lies at least by a few percent below the energy of the combustion heat that will be used for the release of the hydrogen.

10. A method according to claim 9, further comprising the step of bringing a fluid carrier medium of thermal energy at least indirectly into heat-transferring connection with the metal storage means during the filling operation of said metal storage means for the utilization of the binding energy released during said filling operation.

11. A method according to claim 8, comprising the step of bringing a fluid carrier medium of thermal energy during the filling operation at least indirectly into heat-transferring connection with the metal storage means for the utilization of the binding energy released during the filling of the metal storage means.

12. A method according to claims 8 or 9, further comprising the steps of recovering the exhaust heat of internal combustion engines and connecting the metal storage means during the filling operation at least indirectly to the circulation of a fluid carrier medium of thermal energy of a stationary heating means.

13. An installation for at least partially recovering the exhaust heat of combustion operations, characterized in that hydrogen is used at least in part during the combustion, which is stored in the form of a metal hydride in a metal storage means and is released therefrom by a supply of heat energy, in that exhaust heat of the combustion is fed to the metal hydride for the release of the hydrogen, in that the metal storage means freed at least to a large extent of hydrogen is used as storage means for latently bound heat energy which is released during the filling of the metal storage means with hydrogen to form a metal hydride and which may be operably utilized, and in that the metal storage means are interchangeable so that the metal storage means freed to at least a large extent of hydrogen may be replaced by metal storage means filled with hydrogen and so that the metal storage means freed at least to a large extent of hydrogen may be stored at an exchange station.

14. An installation according to claim 13, characterized by utilizing metal hydride heat-storage means in which the release energy for hydrogen lies by a few percent below the energy of the combustion heat which will be used for the release of the hydrogen.

15. An installation according to claim 13, characterized in that for the utilization of the binding energy released during the filling of the metal storage means, a fluid carrier medium is brought at least indirectly into a heat-transferring connection with the metal storage means during the filling operation.

16. A method for at least partially recovering the exhaust heat of internal combustion engines in a motor vehicle comprising the steps of utilizing hydrogen for combustion which is present in metal hydrides in a metal storage means and is released therefrom by a supply of heat energy, feeding exhaust heat of said combustion to the metal hydride for release of the hydrogen, connecting the metal storage means once freed at least to a great extent of hydrogen to a stationary means for the filling of the metal storage means with hydrogen and for utilizing heat released during the filling by circulation of a fluid carrier medium of thermal energy of the stationary heating means.

17. A method according to claim 16, characterized in that said stationary heating means is a thermal power plant.

18. A method according to claim 16, characterized in that said stationary heating means is a central heating system.

19. A method for at least partially recovering the exhaust heat of combustion process, comprising the steps of:
   utilizing removable storage means having a metal hydride contained therein;
   supplying the exhaust heat of combustion to said storage means so as to cause a release of hydrogen from said metal hydride;
   supplying a heated coolant, which has been utilized to remove the heat of combustion from areas proximate said combustion, to said storage means so as to cause a release of hydrogen from said metal hydride;
   utilizing said hydrogen within said combustion process;
   removing the storage means when freed to a great extent of hydrogen;
   replacing the removed storage means with a storage means filled with hydrogen; and
   recharging the removed storage means at a central location separate from the combustion process to utilize the heat released from recharging the removed storage means.

20. The method according to claim 19, and further comprising the steps of:
   recharging said storage means with hydrogen upon the depletion of some hydrogen therefrom;
   utilizing heat released from said storage means during said recharging.

21. The method according to claim 19, wherein said hydrogen is utilized as a fuel in said combustion process.

22. An installation for at least partially recovering the exhaust heat of internal combustion engines characterized in that hydrogen is used at least in part during the combustion which is stored in the form of a metal hydride in a metal storage means and is released therefrom by a supply of heat energy, in that exhaust heat of combustion is fed to the metal hydride for the release of hydrogen, in that the metal storage means freed at least to a large extent of hydrogen is used as storage means of latently bound heat energy which is released during the filling of the metal storage means with hydrogen to form a metal hydride and which may be operably utilized, and in that heat-emitting surfaces of the metal storage means coordinated to the internal combustion engines are connected during the filling operation at least indirectly to the circulation of a fluid carrier medium of thermal energy of a stationary heating means.

23. An installation according to claim 22, characterized in that the stationary heating means is a stationary thermal power plant.

24. An installation according to claim 22, characterized in that the stationary heating means is a central heating system.

25. An installation as set forth in claim 22, further characterized in that the internal combustion engines are in a motor vehicle.

* * * * *